United States Patent
Tang et al.

(10) Patent No.: US 10,185,435 B2
(45) Date of Patent: Jan. 22, 2019

(54) TOUCH CONTROL DISPLAY PANEL AND DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Biyun Tang, Xiamen (CN); Jiancai Huang, Xiamen (CN); Yumin Xu, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 199 days.

(21) Appl. No.: 15/374,399

(22) Filed: Dec. 9, 2016

(65) Prior Publication Data
US 2017/0090663 A1   Mar. 30, 2017

(30) Foreign Application Priority Data

Aug. 9, 2016   (CN) .......................... 2016 1 0647158

(51) Int. Cl.
*G06F 3/041*   (2006.01)
*G06F 3/044*   (2006.01)

(52) U.S. Cl.
CPC ............ *G06F 3/0416* (2013.01); *G06F 3/044* (2013.01); *G06F 3/0412* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2009/0219258 A1* | 9/2009 | Geaghan ................. | G06F 3/045 345/173 |
| 2013/0063371 A1* | 3/2013 | Lee ......................... | G06F 3/044 345/173 |
| 2014/0168540 A1* | 6/2014 | Wang ..................... | G06F 3/0412 349/12 |
| 2015/0185933 A1* | 7/2015 | Zhang ..................... | G06F 3/044 345/174 |
| 2016/0170538 A1* | 6/2016 | Wang ..................... | G06F 3/0412 345/173 |
| 2016/0188087 A1* | 6/2016 | Sun ........................ | G06F 3/044 345/173 |
| 2016/0299614 A1* | 10/2016 | Yang ...................... | G06F 3/044 |

* cited by examiner

*Primary Examiner* — Aneeta Yodichkas
*Assistant Examiner* — Parul H Gupta
(74) *Attorney, Agent, or Firm* — Anova Law Group, PLLC

(57) ABSTRACT

A touch control display panel and a display device are provided. The touch control display panel may comprise a first touch control electrode array and a second touch control electrode array. The first touch control electrode array may include a plurality of first touch control electrodes arranged in a first direction; and the second touch control electrode array may include a plurality of second touch control electrodes arranged in a second direction different from the first direction. An orthogonal projection of a second touch control electrode onto the first touch control electrode array is at least partially overlapped with a first touch control electrode. At least one second touch control electrode is a mesh electrode including a plurality of grids, and a grid has a grid line width of d, where d≤5 μm.

20 Claims, 9 Drawing Sheets

TOUCH CONTROL DISPLAY PANEL AND DISPLAY DEVICE

CROSS-REFERENCES TO RELATED APPLICATIONS

This application claims priority of Chinese Patent Application No. 201610647158.7, filed on Aug. 9, 2016, the entire contents of which are hereby incorporated by reference.

BACKGROUND

Touch control display devices are able to detect the coordinates of the position on a touchscreen contacted by a finger, stylus, or other object, and display corresponding information according to the detected coordinates. To realize a touch control function, a current touch control display panel often includes two touch control electrode layers, each of which includes a plurality of touch control electrodes arranged in parallel. The touch control electrodes in one touch control electrode layer are perpendicular to the touch control electrodes in the other touch control electrode layer. Capacitors are formed in intersections between the touch driving electrodes in the two ouch control electrode layers.

When a touch driving signal is applied to the touch control electrodes and the touchscreen is pressed or tapped by the finger, a capacitance change is introduced, and an electrical current is generated accordingly. Through detecting the electrical current, a touch sensing circuit identifies two perpendicular touch control electrodes where the capacitance changes and, thus, determines the point at which the touch occurs. In existing technologies, the touch control electrodes are often made of transparent conductive glasses, such as indium tin oxide (ITO). However, ITO has a substantially large self-resistance, and the touch sensitivity of the touch control display panel may be substantially poor.

The disclosed touch control display panel and display device thereof are directed to solve one or more problems set forth above and other problems.

BRIEF SUMMARY OF THE DISCLOSURE

One aspect of the present disclosure provides a touch control display panel. The touch control display panel may comprise a first touch control electrode array and a second touch control electrode array. The first touch control electrode array may include a plurality of first touch control electrodes arranged in a first direction; and the second touch control electrode array may include a plurality of second touch control electrodes arranged in a second direction different from the first direction. An orthogonal projection of a second touch control electrode onto the first touch control electrode array is at least partially overlapped with a first touch control electrode. At least one second touch control electrode is a mesh electrode including a plurality of grids, and a grid has a grid line width of d, where d≤5 µm.

Another aspect of the present disclosure provides a display device including a touch control display panel. The touch control display panel may comprise a first touch control electrode array and a second touch control electrode array. The first touch control electrode array may include a plurality of first touch control electrodes arranged in a first direction; and the second touch control electrode array may include a plurality of second touch control electrodes arranged in a second direction different from the first direction. An orthogonal projection of a second touch control electrode onto the first touch control electrode array is at least partially overlapped with a first touch control electrode. At least one second touch control electrode is a mesh electrode including a plurality of grids, and a grid has a grid line width of d, where d≤5 µm.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

The present disclosure provides an improved touch control display panel, in which at least one touch control electrode is a mesh electrode. Provided that the touch accuracy substantially remains the same, the area of the conductor to fabricate the touch control electrodes may be reduced and, thus, the resistance of the touch control electrodes may be reduced. Accordingly, the touch sensitivity may be improved.

Figure 1:
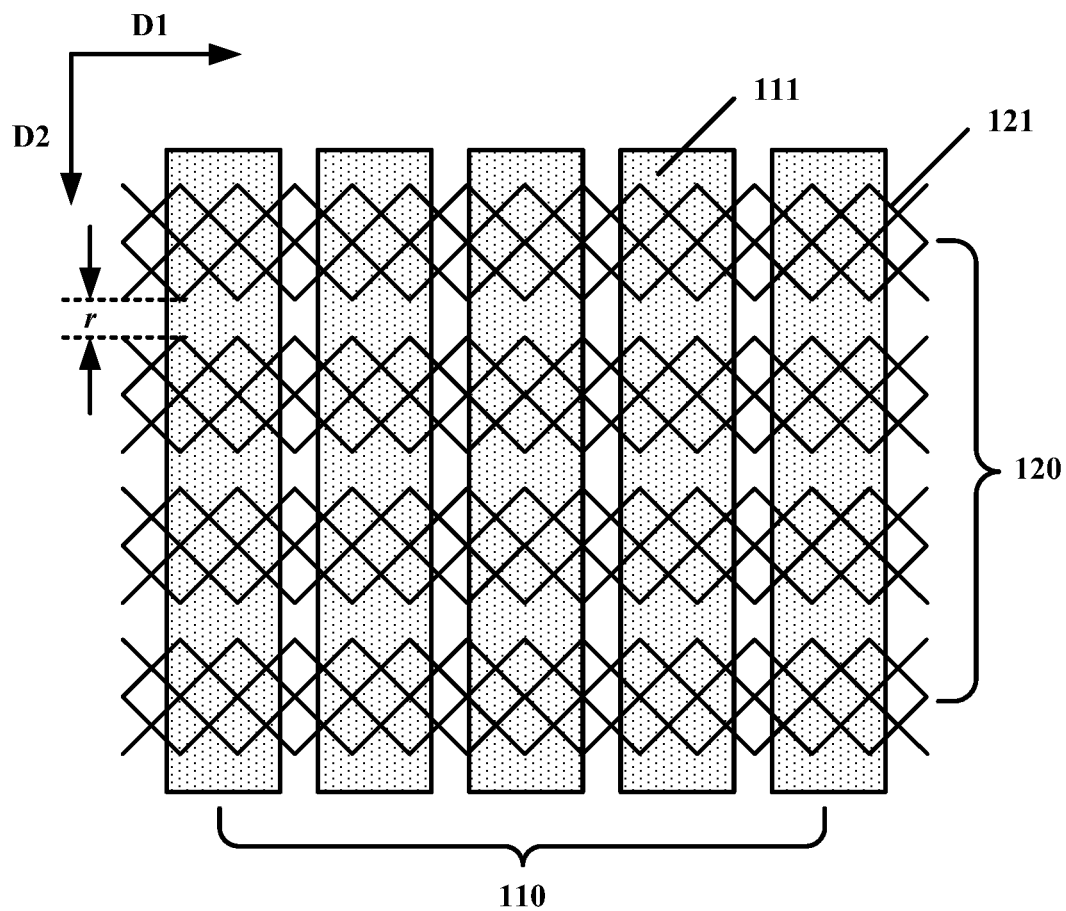
FIG. 1 illustrates a top view of an exemplary touch control display panel consistent with disclosed embodiments.

FIG. 1 illustrates a top view of an exemplary touch control display panel consistent with disclosed embodiments. As shown in FIG. 1, the touch control panel display may include a first touch control electrode array 110 and a second touch control electrode array 120. The first touch control electrode array 110 may include a plurality of first touch control electrodes 111 arranged in a first direction D1 and extending in a second direction D2. The second touch control electrode array 120 may include a plurality of second touch control electrodes 121 arranged in a second direction D2 and extending in the first direction D1. The first touch control electrodes 111 may be arranged in parallel, and the second touch control electrodes 121 may also be arranged in parallel.

The first touch control electrode 111 and the second touch control electrode 121 may have different shapes according to various application scenarios. In one embodiment, as shown in FIG. 1, the first touch control electrode 111 and the second touch control electrode 121 may be a stripe-shaped electrode, respectively. In another embedment, the first touch control electrode 111 and the second touch control electrode 121 may be electrodes different from the stripe-shaped electrodes, such as zip-zag electrodes, and wave-shaped electrodes, etc. The numbers and the shape of the first touch control electrode 111 and the second touch control electrode 121 in FIG. 1 are for illustrative purposes, and are not intended to limit the scope of the present disclosure.

Further, the first touch control electrodes 111 may intersect or cross the second touch control electrodes 121, an orthogonal projection of the second touch control electrode 121 onto the first touch control electrode array 110 may be at least partially overlapped with the first touch control electrode 111. Thus, each first touch control electrode 111 may intersect each second touch control electrode 121 to form a plurality of intersections, and a plurality of capacitors may be formed in the intersections between the first touch control electrodes 111 and the second touch control electrodes 121. When being pressed or tapped by a finger, the touch control display panel may be able to identify a corresponding touch position through detecting the position of the capacitor having a capacitance change.

Figure 2:
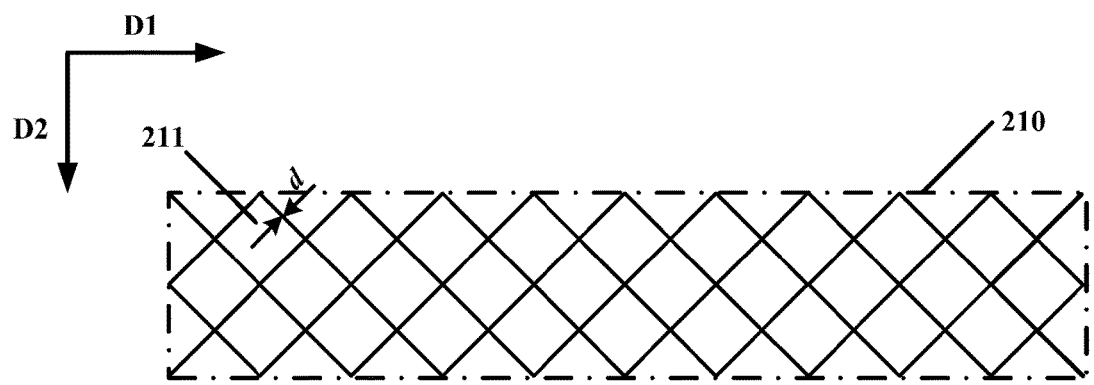
FIG. 2 illustrates a top view of an exemplary second touch control electrode in an exemplary touch control display panel consistent with disclosed embodiments.

In the disclosed embodiments, at least one second touch control electrode 121 second touch control electrode array 120 may be a mesh electrode. FIG. 2 illustrates a top view of an exemplary second touch control electrode in an exemplary touch control display panel consistent with disclosed embodiments.

As shown in FIG. 2, the second touch control electrode 210 may be a mesh electrode including a plurality of grids 211. Thus, the area of the conductor to fabricate the second touch control electrode may be reduced and, accordingly, the resistance of the second touch control electrode may be reduced. In the existing technologies, the second touch control electrode is often made of ITO or other conductive glasses. Because the mesh electrode has a smaller resistance than the traditional ITO electrode, the disclosed touch control display panel may have an improved touch sensitivity.

Further, in the mesh electrode, the width of the grid line, i.e., the grid line width, may be determined according to various application scenarios. In one embodiment, the mesh electrode may have a grid line width d≤5 μm. That is, each wire forming the grid lines in the mesh electrode, may have a line width smaller than or equal to 5 μm. Due to the substantially narrow grid line width, the wires may not go through a light transmission area of the pixels, and the light transmittance of the touch control display panel may be not affect by the mesh electrode.

It should be noted that, FIG. 2 shows that an electrical connection between two adjacent grids is realized through a shared grid line, which is for illustrative purposes and are not intended to limit the scope of the present disclosure. According to various application scenarios, the electrical connection between two adjacent grids may be realized in different ways. Certain exemplary electrical connections between two adjacent grids in the mesh electrode are illustrated in FIGS. 3-5.

Figure 3:
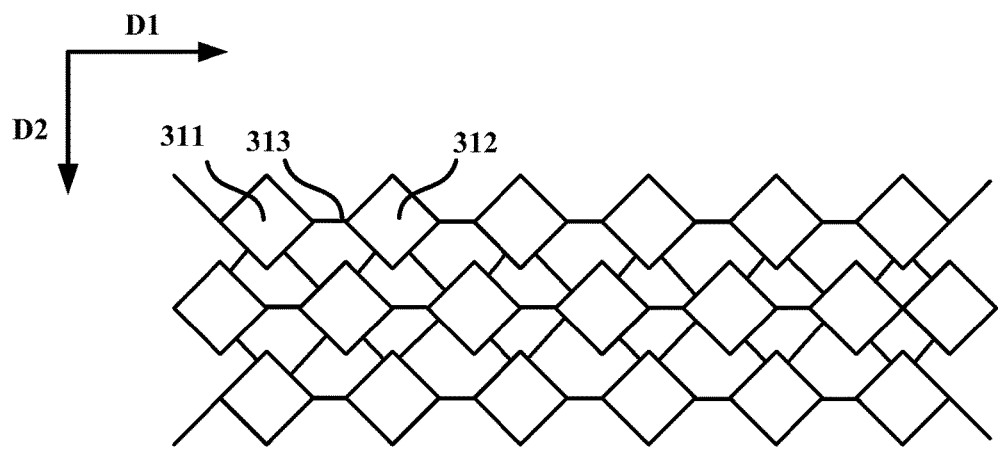
FIG. 3 illustrates a top view of another exemplary second touch control electrode in an exemplary touch control display panel consistent with disclosed embodiments.

FIG. 3 illustrates a top view of another exemplary second touch control electrode in an exemplary touch control display panel consistent with disclosed embodiments. As shown in FIG. 3, an electrical connection between two adjacent grids 311 and 312 may be realized through a connector 313.

Figure 4:
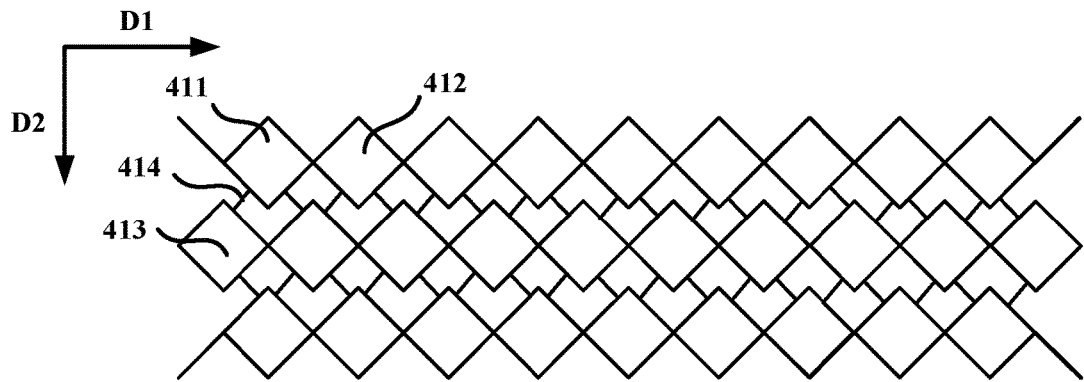
FIG. 4 illustrates a top view of another exemplary second touch control electrode in an exemplary touch control display panel consistent with disclosed embodiments.

FIG. 4 illustrates a top view of another exemplary second touch control electrode in an exemplary touch control display panel consistent with disclosed embodiments. As shown in FIG. 4, an electrical connection between two grids 411 and 412 adjacent in the first direction D1 may be realized through a shared grid line or a shared grid point. Meanwhile, an electrical connection between two grids 411 and 413 adjacent in the second direction D2 may be realized through a connector 414.

Figure 5:
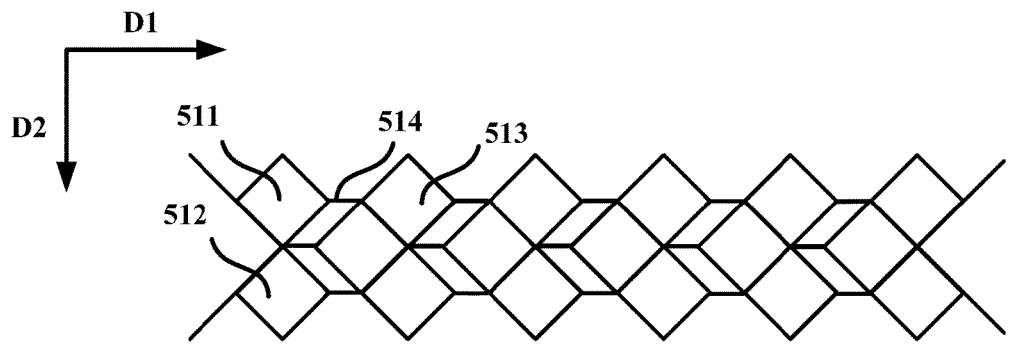
FIG. 5 illustrates a top view of another exemplary second touch control electrode in an exemplary touch control display panel consistent with disclosed embodiments.

FIG. 5 illustrates a top view of another exemplary second touch control electrode in an exemplary touch control display panel consistent with disclosed embodiments. As shown in FIG. 5, an electrical connection between two grids 511 and 513 adjacent in the first direction D1 may be realized through a connector 514. Meanwhile, an electrical connection between two grids 511 and 512 adjacent in the second direction D2 may be realized through a shared grid line or a shared grid point.

In one embodiment, the mesh electrode may be disposed as a metal layer. That is, the mesh electrode is a metal mesh electrode, the grid forming the metal mesh electrode is a metal grid, and a wire forming the grid is a metal wire. Because the mesh electrode is made of metals, the resistance of the mesh electrode may be further reduced, and the touch sensitivity of the touch control display panel may be further improved. In addition, the mesh metal electrode may be flexible and, thus, may be adopted as a touch control electrode in a flexible touch control display panel.

In another embodiment, the mesh electrode may be a transparent mesh electrode. On one hand, the resistance of the second touch control electrode may be reduced, and the touch sensitivity of the touch control display panel may be improved. On the other hand, the disclosed touch control display panel may have similar optical properties as the current touch control display panel having ITO second control electrodes. That is, the wires of the mesh electrode may not go through the light transmission area of the pixels, and the light transmittance of the touch control display panel may be not affect by the mesh electrode.

Table 1 illustrates optical properties of a current touch control display panel having ITO second touch control electrodes.

TABLE 1

| Sample No. | T % | H % | L | A | B |
|---|---|---|---|---|---|
| 1 | 86.29 | 1.51 | 95.06 | 0.46 | 1.75 |
| 2 | 86.31 | 1.52 | 95.10 | 0.54 | 1.73 |
| 3 | 86.34 | 1.54 | 95.11 | 0.46 | 1.81 |
| Average | 86.31 | 1.52 | 95.09 | 0.49 | 1.76 |

Table 2 illustrates optical properties of an exemplary touch control display panel having mesh second touch control electrodes.

TABLE 2

| Sample No. | T % | H % | L | A | B |
|---|---|---|---|---|---|
| 1 | 87.41 | 2.34 | 94.93 | −0.35 | 0.30 |
| 2 | 87.43 | 2.35 | 94.94 | −0.36 | 0.27 |
| 3 | 87.45 | 2.33 | 94.95 | −0.36 | 0.31 |
| Average | 87.39 | 2.34 | 94.94 | (0.36) | 0.29 |

As shown in Table 1 and Table 2, T % denotes the light transmittance of the touch control display panel; H % denotes the light reflectance of the touch control display panel; L denotes the brightness of the touch control display panel, in a unit of nit; A denotes red-green color shift in the touch control display panel, where a positive A indicates a red color shift, and a negative A indicates a green color shift; and B denotes yellow-blue color shift in the touch control display panel, where a positive B indicates a yellow color shift, and a negative B indicates a blue color shift.

As shown in Table 1 and Table 2, compared to the current touch control display panel having ITO second touch control electrodes, the light transmittance T % and the light reflectance H % of the touch control display panel having metal second touch control electrodes are increased by 1.3% and 5.4%, respectively, while the corresponding brightness L is only reduced by 0.018%. Meanwhile, the touch control display panel having metal second touch control electrodes may exhibit a smaller color shift than the current touch control display panel having ITO second touch control electrodes. In particular, the red-green color shift is reduced by 26.5%, and the yellow-blue color shift is reduced by 83.52%.

According to the above comparison, through adopting a mesh electrode as the second touch control electrode, the optical properties of the disclosed touch control display panel may be significantly improved. Accordingly, the image performance of the disclosed touch control display panel may be significantly enhanced.

It should be noted that, the data (i.e., T %, H %, L, A, B) shown in Table 1 and Table 2 is for illustrative purposes and is not intended to limit the scope of the present disclosure. For mesh electrodes made of different metals, the data may be different. In addition, the shape and the number of the grids in the mesh electrode shown in FIGS. 2-5 are for illustrative purposes and are not intended to limit the scope of the present disclosure. The gird in the mesh electrode may have various shapes according to different application scenarios, such as a polygonal shape, a circular shape, and an elliptical shape, etc. The grids in one mesh electrode may also have different shapes and/or different sizes. Certain exemplary shapes of the grids in the mesh electrode are shown in FIGS. 6A-6F.

Figure 6A:
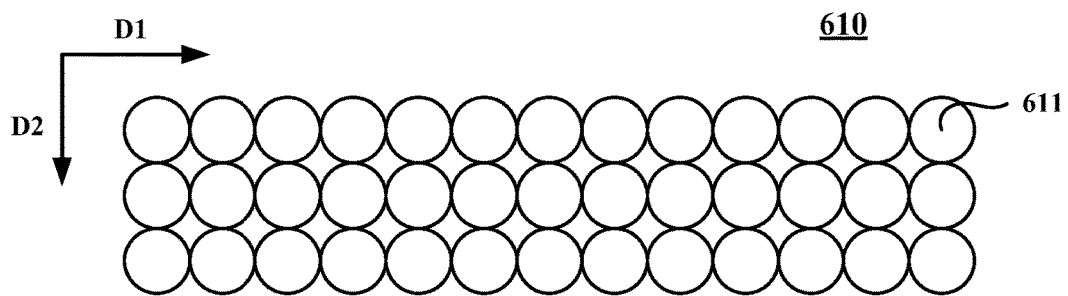
FIGS. 6A-6F illustrate top views of another exemplary second touch control electrode in an exemplary touch control display panel consistent with disclosed embodiments.
Figure 6B:
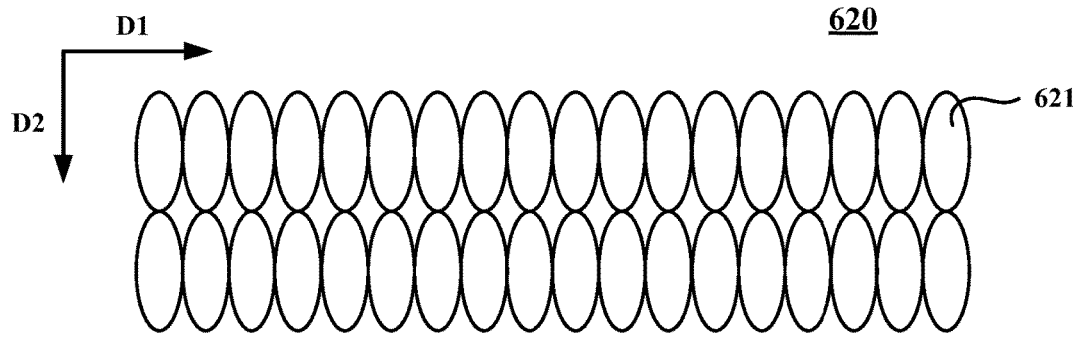
Figure 6C:
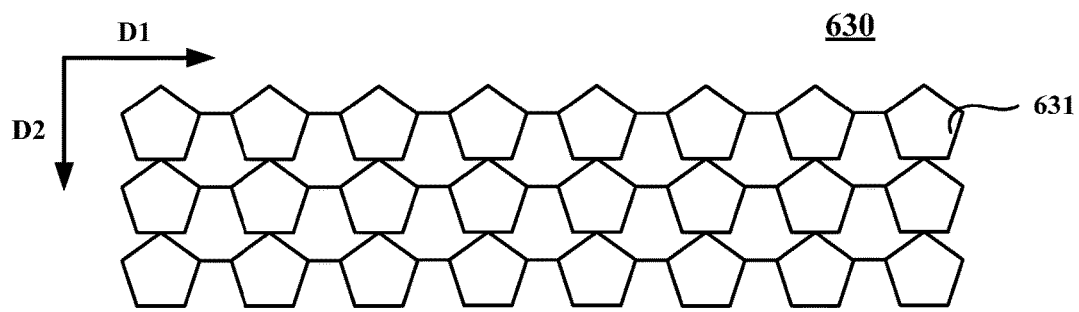

FIGS. 6A-6F illustrate a top view of another exemplary second touch control electrode in an exemplary touch control display panel consistent with disclosed embodiments. As shown in FIG. 6A, a mesh electrode 610 may include a plurality of grids 611, which may have a circular shape. As shown in FIG. 6B, a mesh electrode 620 may include a plurality of grids 621, which may have an elliptical shape. As shown in FIG. 6C, a mesh electrode 630 may include a plurality of grids 631, which may have a polygonal shape.

Figure 6D:
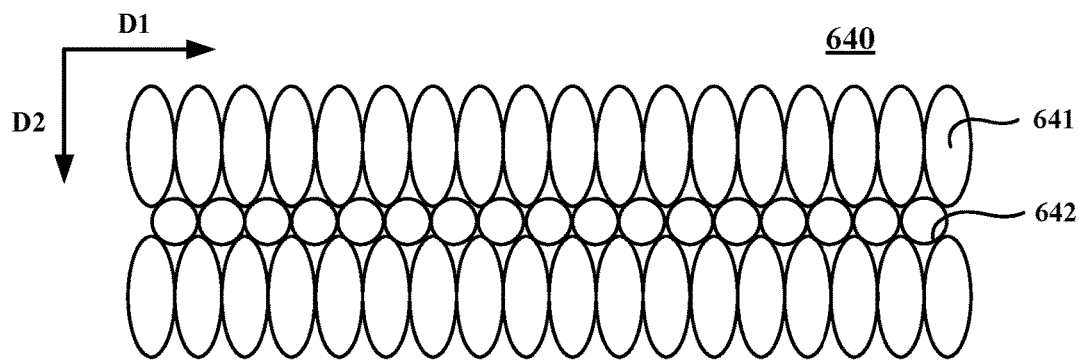

Further, the mesh electrode may include a plurality of grids having different shapes and/or different sizes. In one embodiment, as shown in FIG. 6D, a mesh electrode 640 may include a plurality of grids 642 and a plurality of grids 641. The grid 642 may have a circular shape, and the gird 641 may have an elliptical shape. The grids 641 and the grids 642 in different shapes may be alternately arranged in the second direction D2.

Figure 6E:
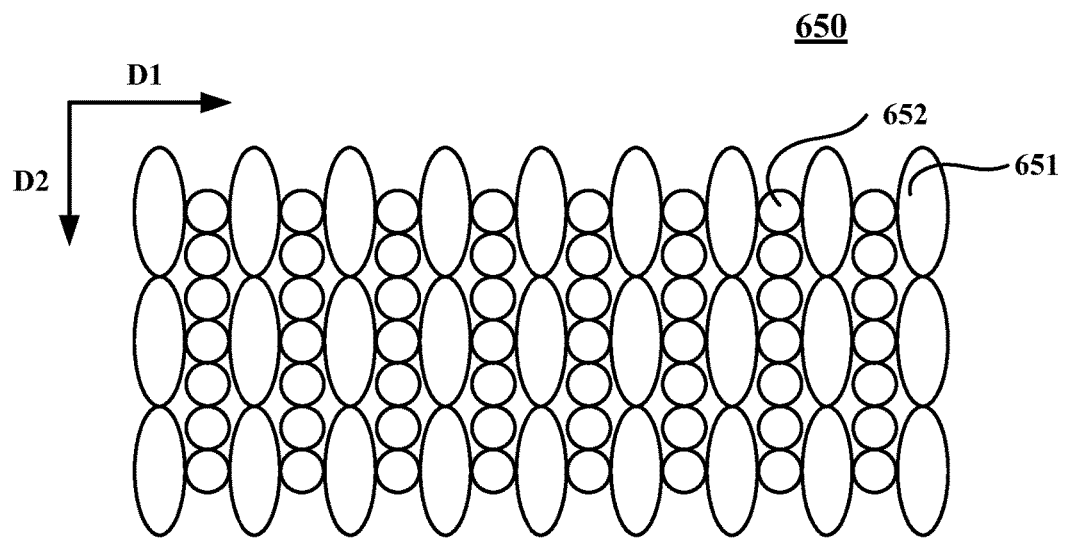
Figure 6F:
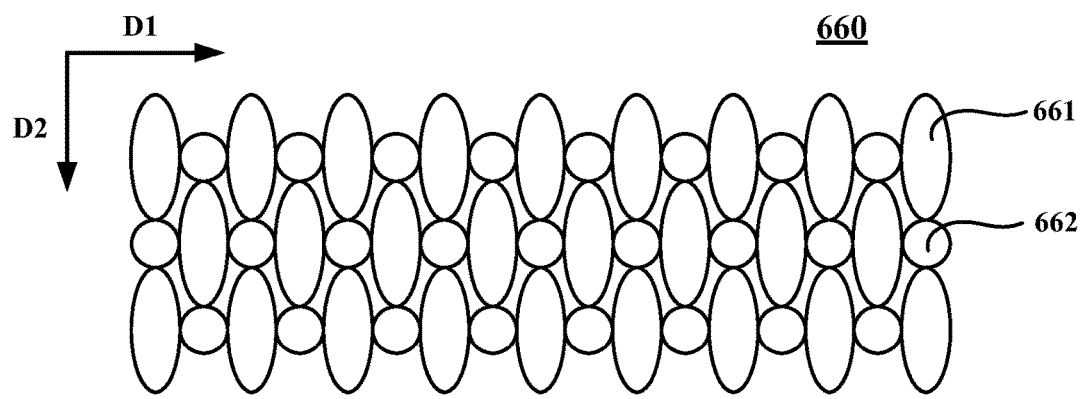

In another embodiment, as shown in FIG. 6E, a mesh electrode 650 may include a plurality of grids 652 and a plurality of grids 651. The grid 652 may have a circular shape, and the gird 651 may have an elliptical shape. The grids 651 and the grids 652 in different shapes may be alternately arranged in the first direction D1.

In another embodiment, as shown in FIG. 6E, a mesh electrode 660 may include a plurality of grids 662 and a plurality of grids 661. The grid 662 may have a circular shape, and the gird 661 may have an elliptical shape. The grids 661 and the grids 662 in different shapes may be alternately arranged in both the first direction D1 and the second direction D2.

Regardless of the grid shape and the grid size, the adjacent grids in the same mesh electrode may be electrically connected to each other through a connector, for example, as shown in FIG. 6C, or through a direct contact, for example, as shown in FIGS. 6A-6B and FIGS. 6D-6F.

Figure 7:
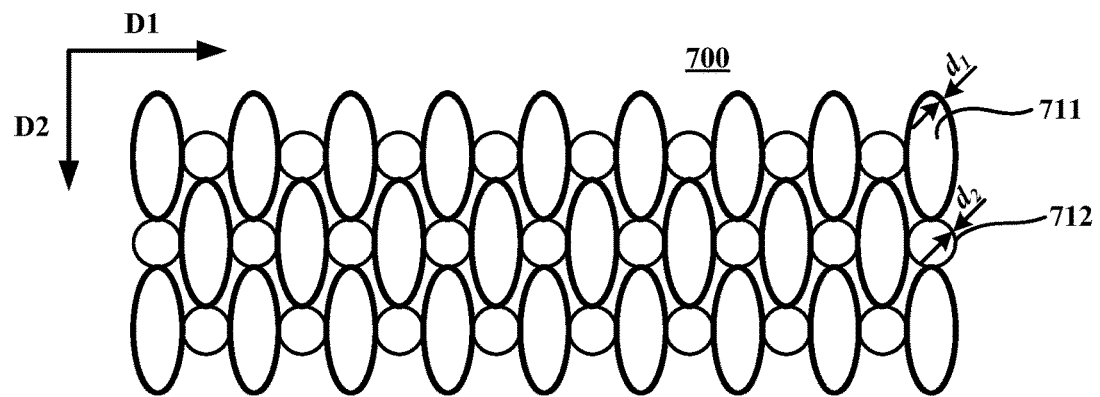
FIG. 7 illustrates a top view of another exemplary second touch control electrode in an exemplary touch control display panel consistent with disclosed embodiments.

Further, in one embodiment, the girds in the same mesh electrode may have the same grid line widths. In another embodiment, the girds in the same mesh electrode may have different grid line widths. FIG. 7 illustrates a top view of another exemplary second touch control electrode in an exemplary touch control display panel consistent with disclosed embodiments. As shown in FIG. 7, the grids in the same mesh electrode may have different grid line widths, i.e., the wires in different grids may have different line widths. In particular, a mesh electrode 700 may include a plurality of circular grids 712 and a plurality of elliptical grids 711. The elliptical grid 711 may have a grid line width of $d_1$, and the circular grid 712 may have a grid line width of $d_2$, where $d_1 > d_2$.

Returning to FIG. 1, two adjacent second touch control electrodes may be provided with a gap between them, and the gap may have a width of r in the second direction D2. The width r may be determined accordingly to different application scenarios. If the width r is substantially large, the touch accuracy of the touch control display panel may be degraded. If the width r is substantially small, an interference or a crosstalk may be caused between two adjacent second touch control electrodes. In one embodiment, the width r may be determined as $2 \ \mu m \leq r \leq 7 \ \mu m$. The crosstalk between two adjacent second touch control electrodes may be suppressed, while a desired touch accuracy may be obtained.

Further, the second touch control electrode array including a plurality of second touch control electrodes may be fabricated in various approaches. In one embodiment, an entire sheet of a metal mesh electrode may be fabricated from a metal conductor. Then the entire sheet of the metal mesh electrode may be etched to form a plurality of second touch control electrodes. To achieve a small resistance of the mesh electrode, materials having a large electrical conductivity may be adopted to fabricate the mesh electrode. In certain embodiments, materials having an electrical conductivity of 3.0 S/m~70 S/m may be selected, for example, silver nanowires, copper, annealed copper, gold, and aluminum, etc.

Table 3 illustrates resistance of a second touch control electrode made of ITO and silver nanowires.

TABLE 2

|  | ITO | Silver nanowires |
| --- | --- | --- |
| Resistance | 60-150Ω | 10Ω |

As shown in Table 3, the second touch control electrode made of silver nanowires may exhibit a much smaller resistance than the second touch control electrode made of ITO. Thus, the second touch control electrode made of silver nanowires may be highly desired in large size touch control display panels. Although the size of the touch control display panel increases, the total resistance of the two touch control electrode arrays may substantially remain the same or even reduced. Accordingly, the touch sensitivity may substantially remain the same or may be even improved.

Further, the first direction D1 and the second direction D2 shown in FIGS. 1-7 are for illustrative purposes and are not intended to limit the scope of the present disclosure. In one embodiment, the first direction D1 may be perpendicular to the second direction D2. In another embodiment, the first direction D1 may be no longer perpendicular to the second direction D2.

In one embodiment, the first touch control electrodes may be touch driving electrodes, and the second touch control electrodes may be touch sensing electrodes. In another embodiment, the first touch control electrodes may be touch sensing electrodes, and the second touch control electrodes may be touch driving electrodes. The touch driving electrodes may intersect or cross the touch sensing electrodes to form a plurality of capacitors, which may detect the touch position. Through applying a touch scanning signal to the touch driving electrodes and acquiring a current change in the touch sensing electrodes, the touch position of the finger may be identified.

Figure 8:
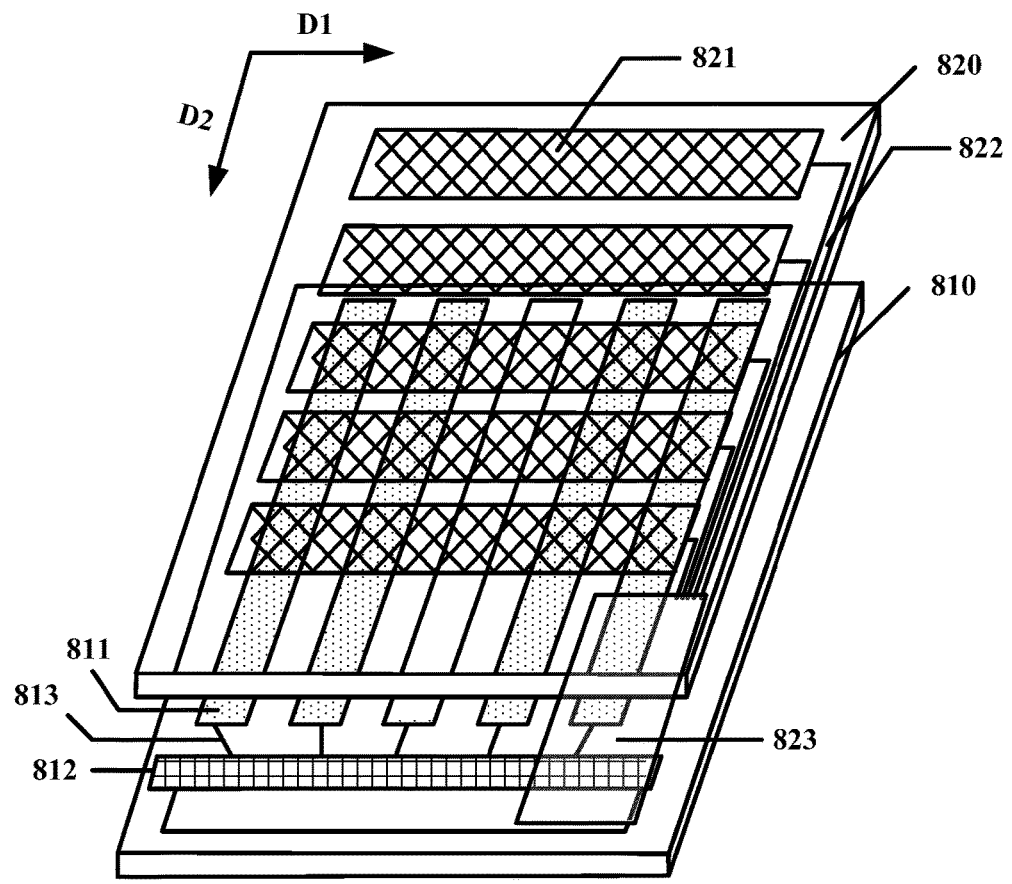
FIG. 8 illustrates an exemplary touch control display panel consistent with disclosed embodiments.

FIG. 8 illustrates an exemplary touch control display panel consistent with disclosed embodiments. As shown in FIG. 8, the touch display panel may include an array substrate 810, a color film substrate 820 arranged opposite to the array substrate 810, display medium (not drawn in FIG. 8) sandwiched between the array substrate 810 and the color film substrate 820. A touch driving electrode array include a plurality of touch driving electrodes 811 may be disposed on the array substrate 810, and a touch sensing electrode array include a plurality of touch sensing electrodes 821 may be disposed on the color film substrate 820. An inner surface of the color film substrate 820 may face an inner surface of the array substrate 810. Other components may also be included.

In one embodiment, the display medium may be liquid crystal materials. In another embodiment, the display medium may be plasma display panel (PDP) display medium, field emission display (FED) display medium, organic light-emitting diode (OLED) display medium, light-emitting diode (LED) display medium, quantum dots (QDs) display medium, electrophoretic display medium or other appropriate display medium capable of displaying videos and/or images.

In one embodiment, the touch sensing electrodes 821 may be disposed on a surface of the color film substrate 820 far away from the array substrate 810. For example, as shown in FIG. 8, the touch sensing electrodes 821 may be disposed on the outer surface of the color film substrate 820. Meanwhile, the touch driving electrodes 811 may be disposed on a surface of the array substrate 810 facing the color film substrate 820. For example, as shown in FIG. 8, the touch driving electrodes 811 may be disposed on the inner surface of the array substrate 810. That is, the touch control display panel may be a hybrid-cell touch control display panel. In another embodiment, the touch control display panel may be an in-cell touch control display panel. In another embodiment, the touch control display panel may be an on-cell touch control display panel.

Figure 10:
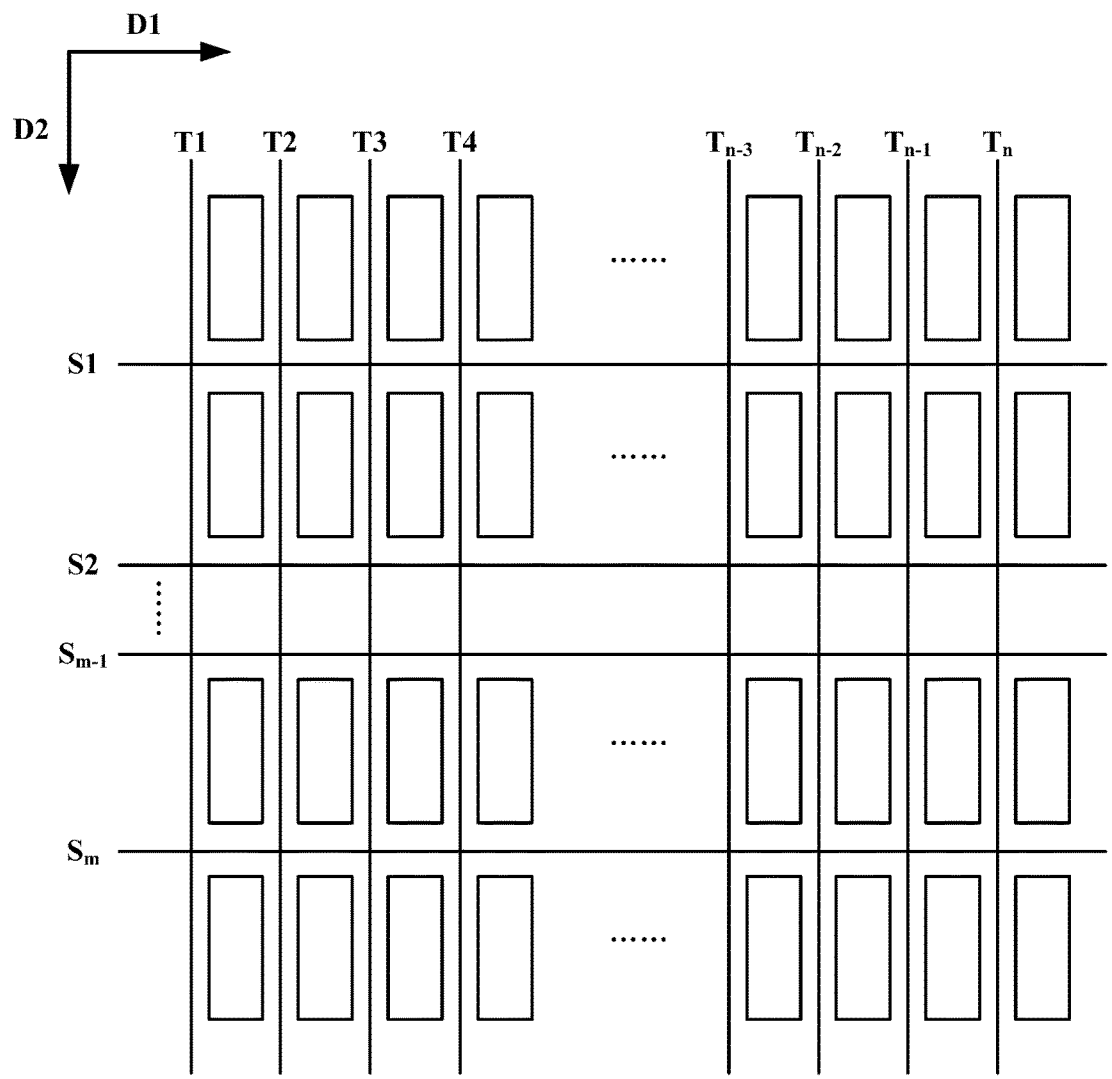
FIG. 10 illustrates exemplary scanning lines and exemplary data lines in an exemplary touch control display panel in FIG. 8 consistent with disclosed embodiments.

Further, the array substrate 810 may also include a plurality of scanning lines and a plurality of data lines. The corresponding structure is shown in FIG. 10. FIG. 10 illustrates exemplary scanning lines and exemplary data lines in an exemplary touch control display panel in FIG. 8 consistent with disclosed embodiments.

As shown in FIG. 10, the array substrate may include a plurality of scanning lines S1-Sm and a plurality of data lines T1-Tn. The scanning lines S1-Sm may intersect or cross the data lines T1-Tn to form a pixel array. The scanning lines may extend in the first direction D1, and the data lines may extend in the second direction D2. That is, referring to FIG. 8 and FIG. 12, the touch driving electrodes 811 may extend in the same direction as the data lines T1-Tn, and the touch sensing electrode 821 may extend in the same direction as the scanning lines S1-Sm.

Returning to FIG. 8, the touch control display panel may further include a first integrated circuit 812, a plurality of touch scanning signal lines 813, and a plurality of touch sensing signal lines 822. In particular, each touch scanning signal line 813 may have a first end electrically connected to the corresponding touch driving electrode 811, and a second end electrically connected to the first integrated circuit 812. Similarly, each touch sensing signal line 822 may have a first end electrically connected to the corresponding touch sensing electrode 821, and a second end electrically connected to the first integrated circuit 812.

When the touch sensing signal lines 822 are disposed on the color film substrate 820, while the first integrated circuit 812 is disposed on the array substrate 810, the touch sensing signal lines 822 may be electrically connected to the first integrated circuit 812 through a flexible printed circuit (FPC) 823. The flexible printed circuit (FPC) 823 may be respectively connected to the first integrated circuit 812 and the touch sensing signal lines 822, forming a conductive path between the first integrated circuit 812 and the touch sensing signal lines 822.

Further, in a touch stage, the first integrated circuit 812 may provide the touch scanning signal to the touch driving electrodes 811 and, meanwhile, receive the touch sensing signal from the touch sensing electrodes 821. For example, in the touch stage, the first integrated circuit 812 may sequentially provide the touch scanning signal to each touch driving electrode 811, while simultaneously collect the touch sensing signals from all the touch sensing electrodes 821. According to the various touch sensing signals received from the touch sensing electrodes 821, the first integrated circuit 812 may identity the touch position.

In one embodiment, the touch sensing signal lines 822 and the touch sensing electrodes 821 may be disposed in a same conductive layer. In another embodiment, the touch sensing signal lines 822 and the touch sensing electrodes 821 may be disposed in different conductive layers, and each touch sensing signal line 822 may be directly electrically connected to the corresponding touch sensing electrode 821. In another embodiment, the touch sensing signal lines 822 and the touch sensing electrodes 821 may be disposed in different conductive layers, and each touch sensing signal line 822 may be indirectly electrically connected to the corresponding touch sensing electrode 821, e.g., via a through-hole disposed in an insulating layer between the conductive layer having the touch sensing signal lines 822 and the conductive layer having the touch sensing electrodes 821.

In one embodiment, in a display stage, the touch driving electrodes 811 may be multiplexed as a common electrode, for example, through a time-divisional driving method, the first integrated circuit 812 may also provide a common voltage signal to each touch driving electrode 811. Thus, the liquid crystal molecules in the liquid crystal display medium (not drawn in FIG. 8), which are sandwiched between the array substrate 810 and the color film substrate 820, may be deflected under an electric filed generated between the common electrode and pixel electrodes. Accordingly, predetermined images may be displayed on the touch control display panel. In another embodiment, the touch driving electrodes 811 may not be multiplexed as a common electrode, i.e., the touch driving electrodes 811 may be different from the common electrode.

Figure 9:
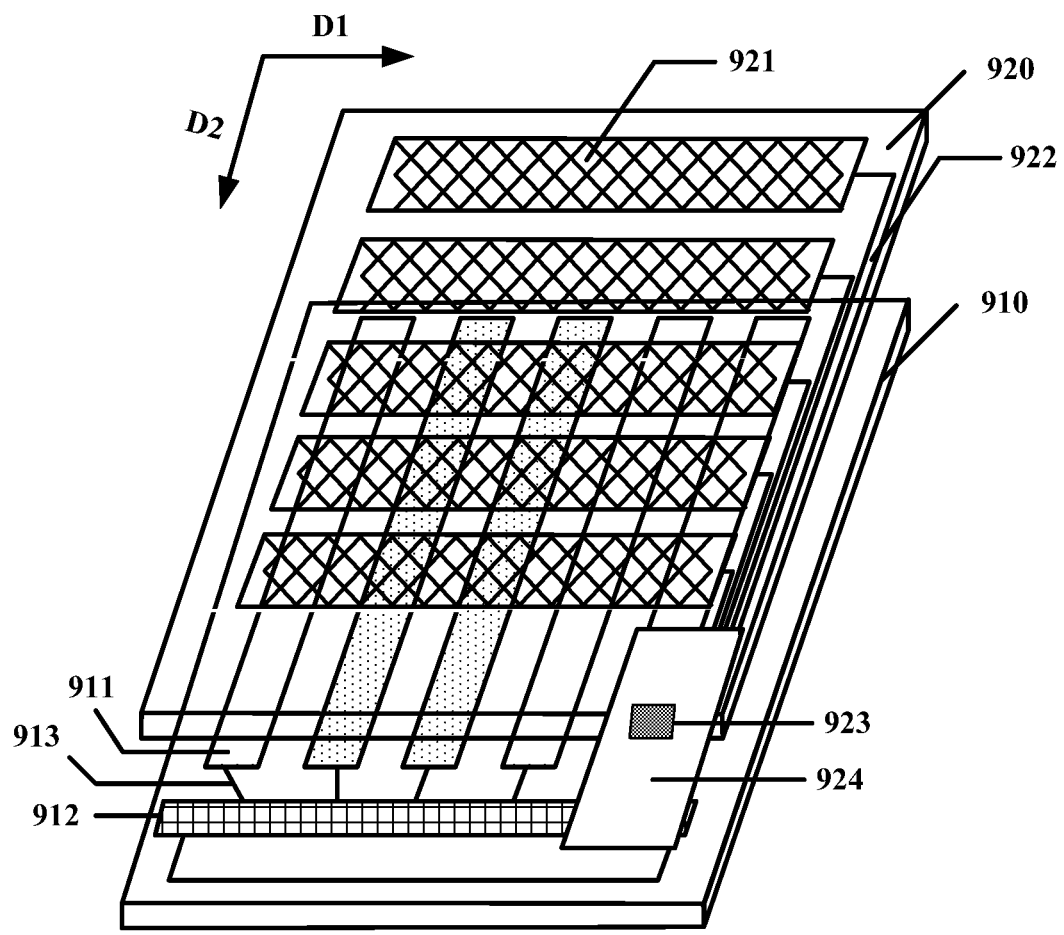
FIG. 9 illustrates another exemplary touch control display panel consistent with disclosed embodiments.

FIG. 9 illustrates an exemplary touch control display panel consistent with disclosed embodiments. The similarities between FIG. 9 and FIG. 8 are not repeated here, while certain differences may be explained.

As shown in FIG. 9, the touch display panel may include an array substrate 910 and a color film substrate 920 arranged opposite to the array substrate 910. A touch driving electrode array including a plurality of touch driving electrodes 911 may be disposed on the array substrate 910, and a touch sensing electrode array including a plurality of touch sensing electrodes 921 may be disposed on the color film substrate 920.

In one embodiment, the touch sensing electrodes 921 may be disposed on a surface of the color film substrate 920 far away from the array substrate 910. For example, as shown in FIG. 9, the touch sensing electrodes 921 may be disposed on the outer surface of the color film substrate 920. Meanwhile, the touch driving electrodes 911 may be disposed on a surface of the array substrate 910 facing the color film substrate 920. For example, as shown in FIG. 9, the touch driving electrodes 911 may be disposed on the inner surface of the array substrate 910. That is, the touch control display panel may be a hybrid-cell touch control display panel. In another embodiment, the touch control display panel may be an in-cell touch control display panel. In another embodiment, the touch control display panel may be an on-cell touch control display panel.

Different from the touch control display panel in FIG. 8, the touch control display panel in FIG. 9 may include two integrated circuits, i.e., a first integrated circuit 912 and a second integrated circuit 923, to realize the function of the first integrated circuit 812 in FIG. 8. In particular, each touch scanning signal line 913 may have a first end electrically connected to the corresponding touch driving electrode 911, and a second end electrically connected to the first integrated circuit 912. Similarly, each touch sensing signal line 922 may have a first end electrically connected to the corresponding touch sensing electrode 921, and a second end electrically connected to the second integrated circuit 923.

The second integrated circuit 923 may transmit the collected touch sensing signals to the first integrated circuit 912 through a flexible printed circuit (FPC) 924. Based on the received touch sensing signals, the first integrated circuit 912 may identify the touch positions. The second integrated circuit 923 and the first integrated circuit 912 may be configured to realize different functions and, thus, the workload of each integrated circuit may be reduced, and the probability of failure of the integrated circuits may be reduced.

As discussed above, in the touch control display panel in FIG. 9, the second integrated circuit 923 may be disposed on the FPC 924, and may transmit the collected touch sensing signals to the first integrated circuit 912 through the FPC 924. However, the position of the second integrated circuit 923 in FIG. 9 is for illustrative purposes and is not intended to limit the scope of the present disclosure. In certain embodiments, the second integrated circuit may be disposed on the array substrate or the color film substrate, and the touch sensing signals may be transmitted to the first integrated circuit through the second integrated circuit and the FPC.

It should be noted that, FIG. 9 and FIG. 8 show that the touch driving electrodes are disposed on the array substrate, while the touch sensing electrodes are disposed on the color film substrate, such configuration is for illustrative purposes and is not intended to limit the scope of the present disclosure. In practical applications, the position of the touch driving electrodes and the touch sensing electrodes may be configured according to various application scenarios. In one embodiment, both the touch driving electrodes and the touch sensing electrodes may be disposed on the array substrate.

In another embodiment, both the touch driving electrodes and the touch sensing electrodes may be disposed on the color film substrate. In another embodiment, the touch driving electrodes and/or the touch sensing electrodes may be disposed on another appropriate substrate different from the array substrate and color film substrate, for example, when the display medium is OLED display medium, the ouch driving electrodes and the touch sensing electrodes may be disposed on a cover glass plate.

Figure 11:
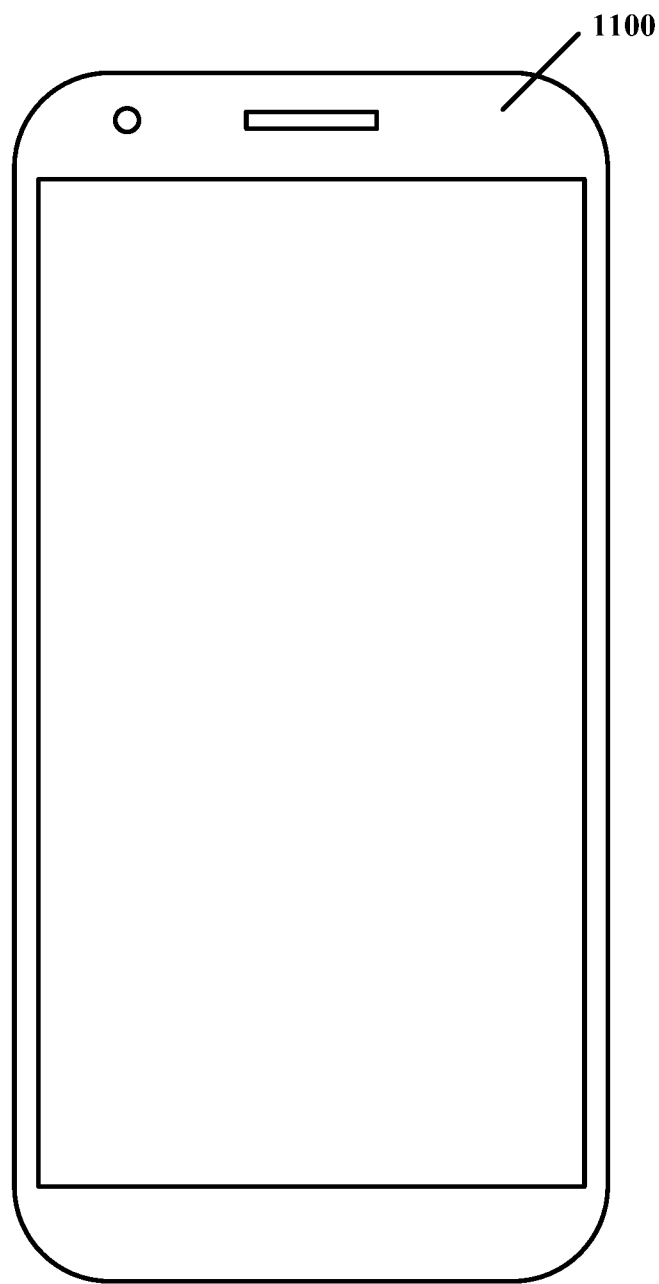
FIG. 11 illustrates an exemplary display device consistent with disclosed embodiments.

The present disclosure further provides an improved display device including any of the disclosed touch control display panels. FIG. 11 illustrates an exemplary display device consistent with disclosed embodiments. The display device 1100 may comprise any of the disclosed touch control display panels. Other components may also be included. Although the display device 1100 shown in FIG. 11 is a smart phone, the display device 1100 may be a smart wearable device, a tablet, a TV, a smartphone, a notebook, and, a digital frame, etc. Further, the display device may be any appropriate type of content-presentation devices. Because the display device may comprise any of the disclosed touch control display panels, the display device may also exhibit the same advantages as the disclosed touch control display panels, which are not repeated here.

In the disclosed embodiments, the second touch control electrode may be a mesh electrode. Provided that the touch accuracy substantially remains the same, the area of the conductor to fabricate the second touch control electrode may be reduced and, thus, the resistance of the second touch control electrode may be reduced. Accordingly, the touch sensitivity may be improved. Further, the mesh electrodes may be fabricated from metal materials. The resistance of the second touch control electrode may be further reduced, and the touch sensitivity may be further improved. In addition, the line width of the grid in the second touch control electrode may have to be selected and, thus, the light transmittance of the touch control display panel and the corresponding display device may not be affected by the mesh electrodes.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A touch control display panel, comprising:
a first touch control electrode array including a plurality of first touch control electrodes arranged in a first direction; and
a second touch control electrode array including a plurality of second touch control electrodes arranged in a second direction different from the first direction,
wherein:
an orthogonal projection of a second touch control electrode onto the first touch control electrode array is at least partially overlapped with a first touch control electrode,
at least one second touch control electrode is a mesh electrode including a plurality of grids, and a grid has a grid line width of d, where d≤5 µm, and
the mesh electrode has an electrical conductivity of approximately 3.0 S/m~70 S/m.

2. The touch control display panel according to claim 1, wherein:
the mesh electrode is a metal mesh electrode, and the grid is a metal grid.

3. The touch control display panel according to claim 1, wherein:
the mesh electrode is a transparent mesh electrode.

4. The touch control display panel according to claim 3, wherein:
in a same mesh electrode, two adjacent grids are electrically connected to each other.

5. The touch control display panel according to claim 1, wherein:
the grid in the mesh electrode has a polygonal shape, a circular shape, or an elliptical shape.

6. The touch control display panel according to claim 5, wherein:
the plurality of grids in the mesh electrode have at least two different shapes.

7. The touch control display panel according to claim 6, wherein:
the grids in different shapes have different grid line widths.

8. The touch control display panel according to claim 1, wherein:
a gap between two adjacent second touch control electrodes has a width of r in the second direction, and 2 µm≤r≤7 µm.

9. The touch control display panel according to claim 1, wherein:
the mesh electrode is made of silver nanowires.

10. The touch control display panel according to claim 1, wherein:
the first touch control electrode is a touch driving electrode; and
the second touch control electrode is a touch sensing electrode.

11. The touch control display panel according to claim 10, further including:
a color film substrate disposed with the second touch control electrodes;
an array substrate disposed with the first touch control electrodes;
a plurality of scanning lines extending in the first direction; and
a plurality of data lines extending in the second direction and intersecting the data scan lines;
wherein the second touch control electrodes disposed on a surface of the color film substrate far away from the array substrate.

12. The touch control display panel according to claim 11, wherein the array substrate further includes:
a plurality of touch sensing signal lines, wherein a touch sensing signal line has a first end electrically connected to a corresponding second touch control electrode.

13. The touch control display panel according to claim 12, wherein the array substrate further includes:
a plurality of touch scanning signal lines,
wherein a touch scanning signal line has a first end electrically connected to a corresponding first touch control electrode, and
in a display stage, the first touch driving electrode is multiplexed as a common electrode.

14. The touch control display panel according to claim 13, further including:
a first integrated circuit,
wherein the touch scanning signal line has a second end electrically connected to the first integrated circuit,
in a touch stage, the first integrated circuit provides a touch scanning signal to the first touch control electrodes, and
in the display stage, the first integrated circuit provides a common voltage signal to the first touch control electrodes.

15. The touch control display panel according to claim 14, wherein:
the touch sensing signal line has a second end electrically connected to the first integrated circuit; and
in the touch stage, the first integrated circuit receives a touch sensing signal from the second touch control electrode.

16. The touch control display panel according to claim 14, further including:
a second integrated circuit,
wherein the touch sensing signal line has a second end electrically connected to the second integrated circuit, and
in a touch stage, the second integrated circuit receives a touch sensing signal from the second touch control electrode.

17. A display device comprising a touch control display panel, wherein the touch control display panel comprises:
a first touch control electrode array including a plurality of first touch control electrodes arranged in a first direction; and
a second touch control electrode array including a plurality of second touch control electrodes arranged in a second direction different from the first direction,
wherein:
an orthogonal projection of a second touch control electrode onto the first touch control electrode array is at least partially overlapped with a first touch control electrode,
at least one second touch control electrode is a mesh electrode including a plurality of grids, and a grid has a grid line width of d, where d≤5 µm, and
the mesh electrode has an electrical conductivity of approximately 3.0 S/m~70 S/m.

18. The display device according to claim 17, wherein:
the mesh electrode is a metal mesh electrode, and the grid is a metal grid.

19. The display device according to claim 17, wherein:
the mesh electrode is a transparent mesh electrode.

20. A touch control display panel, comprising:
a first touch control electrode array including a plurality of first touch control electrodes arranged in a first direction; and
a second touch control electrode array including a plurality of second touch control electrodes arranged in a second direction different from the first direction,
wherein:
   an orthogonal projection of a second touch control electrode onto the first touch control electrode array is at least partially overlapped with a first touch control electrode,
   at least one second touch control electrode is a mesh electrode including a plurality of grids, and a grid has a grid line width of d, where d≤5 μm, and
a gap between two adjacent second touch control electrodes has a width of r in the second direction, and 2 μm≤r≤7 μm.

* * * * *